United States Patent [19]

Dauerman et al.

[11] 4,267,156

[45] May 12, 1981

[54] METHOD USING LIME SLURRY FOR REGENERATING SODIUM SULFITE IN DOUBLE ALKALI FLUE GAS DESULFURIZATION PROCESS

[75] Inventors: Leonard Dauerman, Ft. Lee; Krishna K. Rao, Paterson; Joseph C. Dabbs, Fort Lee; Brian Delaney, Roseland, all of N.J.

[73] Assignee: The Foundation at New Jersey Institute of Technology, Newark, N.J.

[21] Appl. No.: 56,467

[22] Filed: Jul. 11, 1979

[51] Int. Cl.$^3$ .............................................. C01B 17/00
[52] U.S. Cl. ............................... 423/242; 423/512 A
[58] Field of Search ............... 423/242, 242 A, 512 A, 423/519

[56] References Cited

U.S. PATENT DOCUMENTS

| | | | |
|---|---|---|---|
| 2,902,342 | 9/1959 | Korley | 71/43 X |
| 3,419,378 | 12/1968 | Kearns | 423/313 |
| 3,911,084 | 10/1975 | Wall et al. | 423/242 |
| 3,989,797 | 11/1976 | Brady et al. | 423/242 |

OTHER PUBLICATIONS

Berry, Chemical Engineers' Handbook, 3rd Ed. 1950, p. 1203.

Primary Examiner—O. R. Vertiz
Assistant Examiner—Gregory A. Heller
Attorney, Agent, or Firm—Howson and Howson

[57] ABSTRACT

In the process of desulfurizing flue gases in which an alkaline solution of sodium, such as sodium sulfite or sodium hydroxide, is contacted with gases in a scrubber to produce a sodium bisulfite solution, an improved method is provided for substantially reducing the time and equipment required to regenerate the sodium solution. In the method, a lime slurry stream and a sodium bisulfite stream are conflowed into a bifurcated mixing nozzle having a pair of converging inlets and a common outlet. The confluence of the streams in the nozzle creates turbulence which causes the lime slurry to react substantially instantaneously with the sodium bisulfite solution to regenerate the sodium solution which is recycled to the scrubber and a calcium sulfite precipitate which is filtered from the sodium solution and discarded.

8 Claims, 3 Drawing Figures

METHOD USING LIME SLURRY FOR REGENERATING SODIUM SULFITE IN DOUBLE ALKALI FLUE GAS DESULFURIZATION PROCESS

FIELD OF THE INVENTION

The present invention relates to the so-called Double Alkali flue gas desulfurization process wherein an alkaline solution of sodium such as sodium sulfite or sodium hydroxide is reacted in a wet scrubber with sulfur dioxide in flue gases to form a sodium bisulfite solution. More particularly, the present invention relates to an improved method and apparatus for regenerating the alkaline solution of sodium using a lime slurry and a mixing nozzle.

BACKGROUND OF THE INVENTION

In recent years, sulfur dioxide has been removed from flue gases by various processes. One such process is the so-called Double Alkali process which essentially involves two steps. Initially, the sulfur dioxide in a flue gas is reacted with an alkaline solution of sodium, such as sodium sulfite or sodium hydroxide, in a wet scrubber to produce a sodium bisulfite solution. The sodium bisulfite solution is then reacted with a lime slurry to regenerate the alkaline solution of sodium to produce a calcium sulfite precipitate which is filtered from the alkaline sodium solution and discarded.

As used herein, the term alkaline solution of sodium refers to a solution comprising sodium ions, sulfite ions and hydroxyl radicals which, at a pH of 7-8, may be regarded as a sodium sulfite solution and, at a pH of 10-11, may be regarded as a sodium hydroxide solution.

Heretofore, the regeneration of the alkaline sodium solution has been effected in a cascade of well-stirred, jacketed, batch-mix reactors. The lime slurry and the sodium bisulfite are admitted through separate ports into each reactor and are normally retained in the reactor for relatively-long residence periods, on the order of thirty minutes or so, before being flowed to the next reactor in the cascade. Upon completion of the reaction, the resulting solution is filtered to remove the calcium sulfite which is discarded, and the sodium solution is recycled to the scrubber.

One of the primary disadvantages of the existing regeneration process resides in the large capital costs required to install the cascade of back-mix reactors. For instance, the cost of a typical batch-mix system is about 5% of the cost of the entire scrubbing system. In a power plant, a typical total cost for a sulfur dioxide scrubbing system is about $50,000,000. Hence, the batch-mix system represents a total cost of about $2,500,000.

Another disadvantage resides in reactor operating costs. Customarily, the batch-mix reactors are maintained at a working temperature of about 100° F. to promote the reaction. Thus, depending upon ambient temperatures, a substantial amount of energy is required simply to maintain the batch-mix reactors at operating temperature.

OBJECTS OF THE INVENTION

With the foregoing in mind, a primary object of the present invention is to improve the efficiency of the process of regenerating an alkaline solution of sodium in the Double Alkali flue gas desulfurization process.

As another object, the present invention provides an improved method and apparatus for regenerating an alkaline sodium solution rapidly and with a minimum of complicated reaction equipment.

A further object of the present invention is to eliminate the need for cascaded back-mix reactors and their thermal and mechanical energy requirements in the process of regenerating an alkaline solution of sodium.

SUMMARY OF THE INVENTION

As a more specific object, the present invention provides a method and apparatus for accelerating the reaction of a lime slurry with an alkaline solution of sodium, such as sodium bisulfite or sodium hydroxide, which is produced from the reaction in a scrubber of the alkaline sodium solution with flue gas containing sulfur dioxide. In the method, a stream of a lime slurry and a stream of sodium bisulfite/sodium hydroxide are conflowed rapidly into a bifurcated mixing nozzle to effect turbulent mixing within the nozzle and thereby to effect a substantially instantaneous reaction of the lime therewith.

BRIEF DESCRIPTION OF THE DRAWINGS

The foregoing and other objects, features and advantages of the present invention should become apparent from the following description when taken in conjunction with the accompanying drawings, in which.

DESCRIPTION OF THE PREFERRED METHOD

Figure 1:
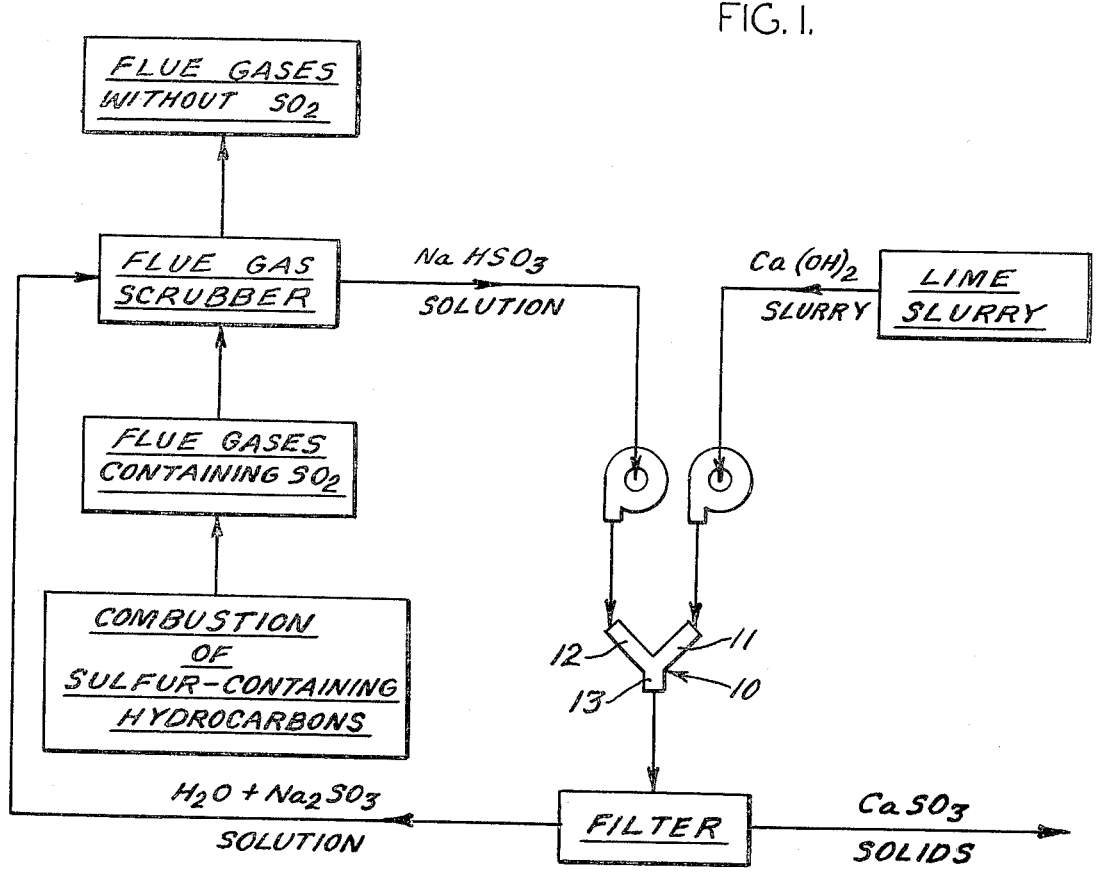
FIG. 1 is a schematic diagram illustrating the process in which the method of the present invention finds particular utility.

Referring now to the drawings, FIG. 1 illustrates schematically the Double Alkali flue gas desulfurization process in which the method and apparatus of the present invention finds particular utility. As seen therein, an aqueous alkaline solution of sodium, such as sodium sulfite or sodium hydroxide, is admitted into a wet flue gas scrubber through which sulfur dioxide laden flue gases are flowed. In the process of removing sulfur dioxide from the flue gases, the sulfur dioxide reacts with the sodium solution in the scrubber to produce a sodium bisulfite solution.

As noted heretofore, the sodium bisulfite solution is presently regenerated by reacting a lime slurry with it in a series of back-mix reactors connected together in cascade. The lime slurry reacts with the sodium bisulfite to produce an aqueous sodium sulfite or sodium hydroxide solution (depending on the pH as noted heretofore) and a calcium sulfite precipitate which is filtered from the solution. The calcium sulfite precipitate is ultimately discarded, and the regenerated sodium solution is recycled to the flue gas scrubber.

The primary disadvantage of the conventional process resides in the relatively slow rate at which the sodium solution is regenerated in the batch-mix reactors. This rate necessitates a relatively long residence time for the reactants in the reactor (on the order of 30 minutes, more or less, depending on stirring, temperature, etc.). As a result, a number of reactors are required, and they are generally cascaded. Also, each batch-mix reactor is normally jacketed and its temperature maintained at about 100° F. to promote the reaction. The need for mixers and additional heat input further decreases the economic efficiency of the conventional process for regenerating the active sodium solution.

In accordance with the present invention, it has been discovered that the time for completion of the reaction of sodium bisulfite with lime can be greatly accelerated, and the aforementioned back-mix reactors, and ancillary stirrers, heating apparatus, etc. eliminated by causing streams of the reactants to be conflowed rapidly through a mixing nozzle of a particular design.

Figure 2:
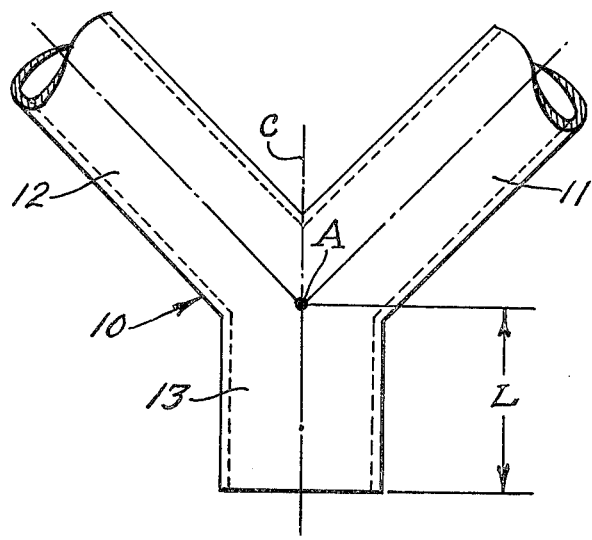
FIG. 2 illustrates a preferred mixing nozzle for carrying out the improved method steps.
Figure 3:
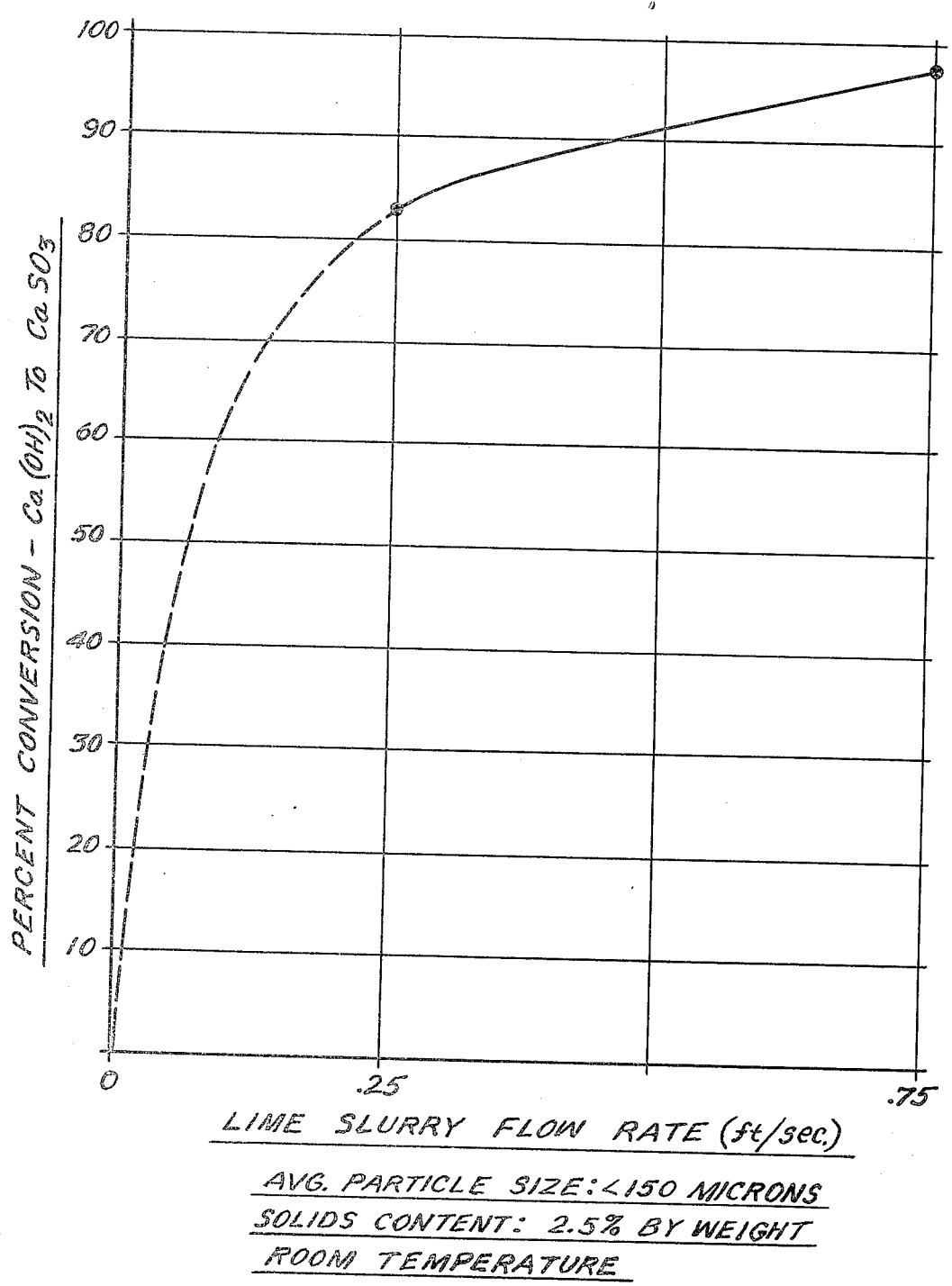
FIG. 3 is a graph illustrating the criticality of the lime slurry flow velocity at the nozzle inlet.

Referring now to the drawing, FIG. 1 illustrates a mixing nozzle 10 which embodies the present invention and which is utilized to react the lime slurry with the sodium bisulfite. As best seen in FIG. 2, the nozzle 10 has bifurcated inlet means providing a pair of inlets 11 and 12 and a common outlet 13 in fluid communication with the inlets 11 and 12. The inlets 11 and 12 are disposed at a dihedral angle of about 60° with respect to one another to form a Y-shaped structure. The dihedral angle has an apex A at the intersection of the centerlines of the inlets 11 and 12, and the common outlet 13 has its centerline C disposed through the apex A. Thus, the nozzle is symmetrical with respect to the outlet centerline C. Preferably, the cross-sectional area of the inlet 11 is equal to the cross-sectional area of the inlet 12, and the cross-sectional area of the outlet 13 is at least as great as the combined cross-sectional areas of the inlets 11 and 12. The preferred length L of the outlet 13 measured from the apex A is about two (2) diameters, based on the inside diameter of the outlet 13.

The method of the present invention comprises the steps of flowing a lime slurry into the inlet 11 of the nozzle 10 at a velocity of excess of a minimum predetermined rate, flowing a sodium bisulfite solution into the other inlet 12 at a rate related to the lime slurry flow rate, conflowing both streams in the nozzle 10 to cause turbulent mixing, whereby the streams react substantially instantaneously in the nozzle 10. Thereafter, the effluent exiting the nozzle 13 is immediately filtered to separate the calcium sulfite solids from the sodium sulfite solution which is recycled to the flue gas scrubber.

In order to effect the reaction with minimum energy, the flow rates of the lime and sodium bisulfite into the inlets 11 and 12, respectively, are preferably maintained in the laminar flow regime at the inlets to the nozzle 10 at a point immediately upstream of the confluence of the inlets 11 and 12 located adjacent the apex A; however, where greater energy consumption is not objectionable, the flow may be turbulent. To ensure adequate mixing, it has been discovered that the flow rate of the lime slurry at the inlet 11 to the nozzle 10 must be greater than a predetermined minimum velocity which corresponds to the settling velocity $V_s$ of the lime particles in the slurry. In other words, the slurry comprises lime particles suspended in a water carrier. Depending on the size of the particles, and solids content of the slurry, the particles will settle out of the water carrier at different flow velocities. As will be discussed, it has been found that when the lime slurry flow rate is below the aforementioned minimum velocity $V_s$ inadequate mixing occurs in the nozzle 10, and all the advantages of the present invention are not realized. Although the process will function at higher velocities in the turbulent flow regime, the power required to flow the streams at such velocities reduces the efficiency of the process and is, therefore, less desirable than when the flow rates are in the laminar flow regime.

By way of example, and not by way of limitation, a mixing nozzle 10 having inlets 11 and 12 each with a 0.6 cm inside diameter and an outlet 13 with an inside diameter of 1.2 cm, and a length of 2 diameters was fabricated. As indicated in FIG. 1, the inlet 11 was connected to a source of lime slurry, and the inlet 12 was connected to a source of sodium bisulfite. As set forth in Table I, the lime slurry was flowed into the inlet 11 at various volumetric flow rates and at different molar concentrations. The solids content of the lime slurry was 2.5% by weight based on the weight of the slurry. The sodium bisulfite was flowed into the other inlet 12 at volumetric flow rates which were related to the flow rates of the lime slurry in such a manner as to provide the stated molar reactant ratios and at approximately equal velocities, i.e. sodium bisulfite velocity at least about 75% of the lime slurry velocity.

The tests were conducted with the lime slurry and sodium bisulfite at ambient room temperatures. The effluent from the outlet 13 was continuously filtered. The filtered solids were analyzed for calcium by the EDTA titration procedure. The analysis was made promptly after about 1 liter of the effluent had been collected. From this information, from the mass balances based on the quantities of the initial reactants, and from the reaction stoichiometry, the data set forth in the Table I were calculated. It is noted that as long as the molar ratio of lime to sodium bisulfite is at least stoichiometric, or lime rich, there is a direct correlation between the percent conversion of calcium hydroxide to calcium sulfite and the conversion of sodium bisulfite to sodium sulfite. Because of certain analytical limitations, the conversion data set forth in Table I is the amount of calcium hydroxide which was analytically determined to have been converted to calcium sulfite divided by the amount of calcium hydroxide which theoretically could have been converted to calcium sulfite at the stated molar ratio.

TABLE I

PERCENT REACTANT CONVERSION AS A FUNCTION OF FLOW RATE AND STOICHIOMETRY

| Run No. | Reactant Flow Rates cc/min (ft/sec.) | | Molar Reactant Ratio | Conversion |
|---|---|---|---|---|
| | $Ca(OH)_2$ | $NaHSO_3$ | $NaHSO_3/Ca(OH)_2$ | (%) |
| 1 | 385(.75) | 300(.585) | .55 | 91 |
| 2 | 385 | 300 | 1.1 | 95 |
| 3 | 385 | 300 | 2.1 | 96 |
| 4 | 130(.25) | 100(.195) | .55 | 76 |
| 5 | 130 | 100 | 1.1 | 85 |
| 6 | 130 | 100 | 2.1 | 88 |

From the example, it was determined that the lime slurry reacted substantially completely and instantaneously with the sodium bisulfite in the mixing nozzle 10 when the flow velocity of the lime slurry is greater than about 0.5 ft/sec. In other words, in Runs 1–3 where the flow velocity of the lime slurry was about 0.75 ft./sec., at least 91% of the calcium available for reaction in a lime rich mixture was reacted in the nozzle, and at the stoichiometric ratio (Run 3) the conversion was even higher at 96%. In Runs 4–6, however, where the flow velocity of the lime slurry was dropped to about 0.25 ft./sec., the conversion dropped to 76% in a lime rich mixture and to 88% at the stoichiometric ratio.

It is believed that the reasons why the lime conversion percentage drops off radically at lime slurry flow velocities below 0.5 ft./sec. is due to the proclivity for the lime particles to settle out of the slurry upstream of the nozzle inlet 11 at the lower flow velocities. When this occurs, the lime particles tend to pass through the nozzle without mixing and this has the effect of defeating the purpose of the invention which is to promote complete and thorough mixing and reaction in the nozzle. Thus, it is important if the full advantages of the present invention are to be realized that the flow velocity of the lime slurry at the inlet to the nozzle be greater than the velocity $V_s$ at which substantial lime particle settling occurs, so that substantially all the lime particles remain in suspension in the lime slurry.

Settling velocity data is available for various water insoluble materials and particle sizes and may be found in Engineering Handbooks such as *Perry's Chemical Engineering Handbook*, 3rd Ed. In the example set forth above, the average particle size was less than 150 microns. From the handbook, the settling velocity $V_s$ for water insoluble particles of this size is about 0.12 ft./sec. Thus, it may be seen that there is a direct correlation between the minimum velocity experimentally determined to be needed in the present invention and the settling velocities which may be obtained from conventional sources for given particle sizes.

Because of the speed of the reaction, the nozzle 10 may be located close to the filter in order to prevent sedimentation in the line downstream of the nozzle outlet 13 caused by the presence of the calcium sulfite precipitate which results from the reaction.

In view of the foregoing, it should be apparent that the present invention provides an improved method and apparatus for regenerating sodium sulfite in the Double Alkali flue gas desulfurization process. The invention enables regeneration to be achieved with a minimum of capital equipment and energy.

While a preferred method and apparatus have been described in detail, various modifications, alterations and changes may be made without departing from the spirit and scope of the present invention as defined by the appended claims.

We claim:

1. In a flue gas desulfurization process wherein sulfur dioxide is reacted in a scrubber with an alkaline solution of sodium to form a sodium bisulfite solution, and wherein the sodium bisulfite solution is reacted with a lime slurry to regenerate the sodium solution for recycling to the scrubber, said slurry comprising lime particles of a predetermined size and a water carrier with said particles having a tendency to settle out of the water carrier at a predetermined velocity of the slurry, the improvement in the regenerating phase of the process comprising the steps of:

producing a stream of a lime slurry flowing at a rate greater than said particle settling velocity, producing a stream of a sodium bisulfite solution flowing at a rate in relation to said lime slurry stream, and simultaneously conflowing said streams into a bifurcated mixing nozzle having a pair of inlets for said streams and a common outlet to cause the lime to react with the sodium bisulfite in the nozzle to produce an effluent comprising a calcium sulfite precipitate and a regenerated alkaline solution of sodium.

2. The process according to claim 1 wherein said alkaline solution of sodium is sodium sulfite.

3. The process according to claim 1 wherein said alkaline solution of sodium is sodium hydroxide.

4. The process according to claim 1 wherein said rate of flow of said slurry is controlled so that substantially all the lime particles in the slurry remain in suspension at the nozzle inlet.

5. The process according to claim 1 wherein said slurry flow rate is at least in the laminar flow regime.

6. The process according to claim 1 where said stream of sodium bisulfite has a volumetric flow rate into said nozzle of at least about 75% of the volumetric flow rate of said lime slurry.

7. The process according to claim 1 wherein the molar ratio of lime to sodium bisulfite in said streams is in a range of about 1:2 to about 2:1.

8. The process according to claim 1 including the step of flowing the effluent from said mixing nozzle outlet directly to a filter for separating the calcium sulfite precipitate from the regenerated sodium solution.

* * * * *